Sept. 10, 1963 W. H. ROBINSON 3,103,039
MOLDING APPARATUS
Filed July 23, 1959 2 Sheets-Sheet 1
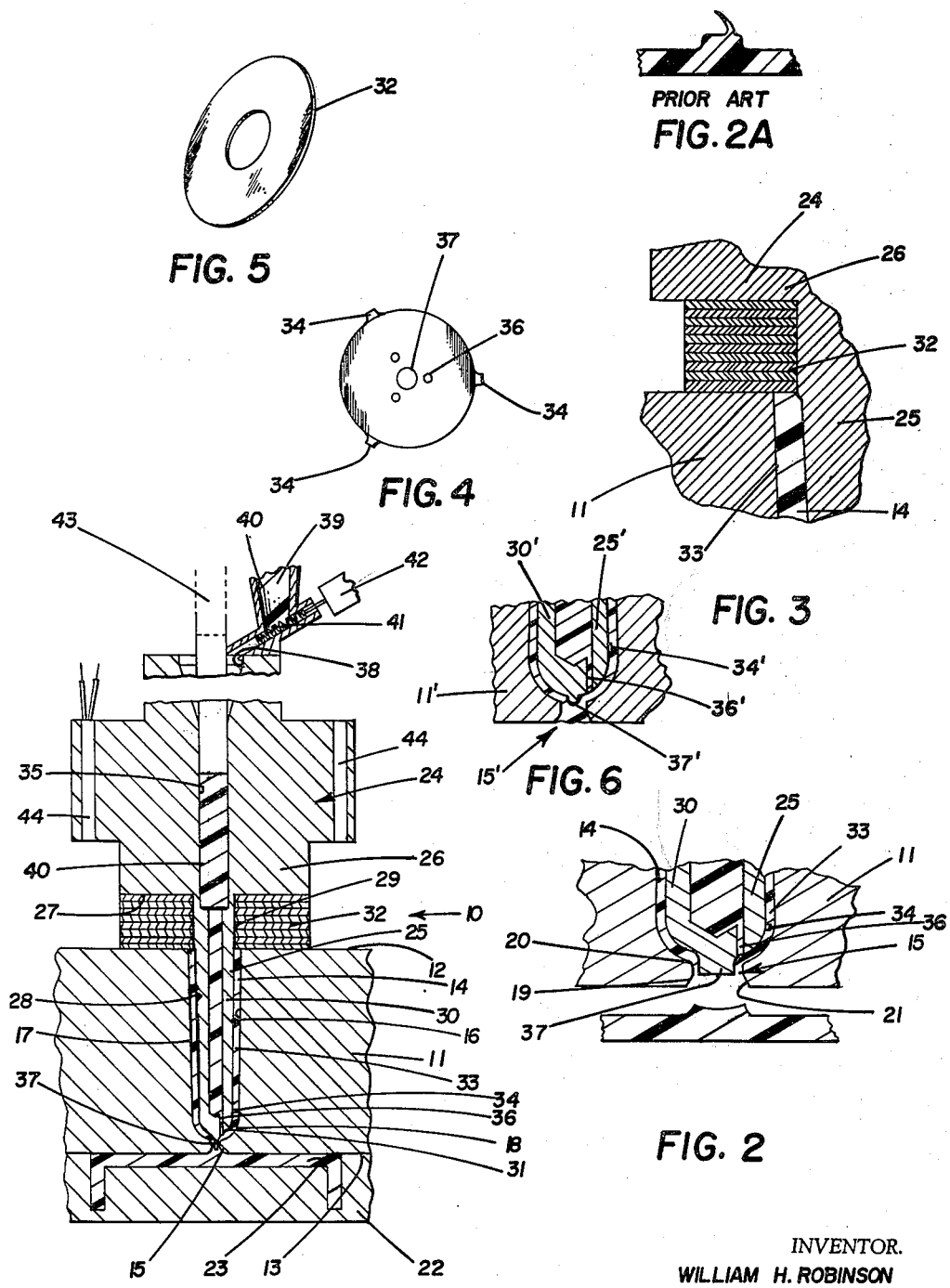
INVENTOR.
WILLIAM H. ROBINSON
BY GLEIM & CANDOR
ATTORNEYS

United States Patent Office 3,103,039
Patented Sept. 10, 1963

3,103,039
MOLDING APPARATUS
William H. Robinson, 602 E. Jefferson St.,
Miamisburg, Ohio
Filed July 23, 1959, Ser. No. 829,012
3 Claims. (Cl. 18—30)

This invention relates to an improved molding apparatus, and, in particular, this invention relates to an improved molding apparatus having an improved nozzle arrangement whereby the molding material is prevented from solidifying in the injection mold chamber inlet gate and/or the heated nozzle structure is effectively insulated from the structure defining the mold chamber.

One of the well known problems in the thermoplastic injection molding field is that the molding material must be heated to a relatively high temperature in order to place the same in the fluid or molten state whereby the molten molding material can be fed under pressure through a suitable nozzle arrangement into a mold chamber. However, the structure defining the mold chamber must be maintained at a relatively low temperature in order to permit the heated molding material forced therein to solidify at a relatively rapid rate. It has been found that if the thermoplastic molding material, such as polyethylene, polystyrene, and the like, does not solidify rapidly in the mold chamber, the resulting molded product tends to fracture or shatter to a greater degree than a similar product which has been solidified at a more rapid rate in the mold chamber.

However, in order to permit the molding material to solidify rapidly in the mold chamber, it has been found, according to the teachings of this invention, that the structure defining the mold chamber must be maintained at a relatively low temperature and thus be effectively insulated from the heated nozzle structure disposed closely adjacent thereto. Further, since the structure defining the mold chamber also defines the mold chamber inlet gate and must be maintained at a relatively low temperature, the heated molding material passing through the mold chamber inlet gate into the mold chamber must be prevented from solidifying in the gate after each molding operation. If the molding material in the mold gate solidifies after each molding operation, some means must be provided to remove the solidified plug in the mold gate before a succeeding product can be molded by the particular injection molding apparatus.

Accordingly, it is an object of the present invention to provide an improved injection molding apparatus.

It is another object of the present invention to provide an improved injection molding apparatus having means for effectively insulating the heated elements thereof from the structure defining the mold chamber whereby the thermoplastic molding material can be rapidly solidified in the mold chamber.

A further object of this invention is to provide an improved molding apparatus having means for preventing the solidification of the thermoplastic molding material in the region of the mold chamber inlet gate whereby excess cleaning or clearing of the mold chamber inlet gate after each molding operation is eliminated.

Another object of this invention is to provide an improved molding apparatus having means for substantially eliminating sprues on the molded product of the apparatus.

Still another object of the present invention is to provide an improved injection molding nozzle having means for preventing the solidification of thermoplastic molding material in the region of a mold inlet gate after each molding operation.

Other objects, uses and advantages of this invention will become apparent upon a reading of the following specification taken in conjunction with the accompanying drawings forming a part thereof and wherein:

FIGURE 1 is an axial cross-sectional view of an injection molding apparatus formed in accordance with the teachings of this invention;

FIGURE 2 is an enlarged fragmentary cross-sectional view of a portion of the apparatus illustrated in FIGURE 1;

FIGURE 2A is an enlarged fragmentary cross-sectional view illustrating the sprue on a molded product formed by prior known apparatus.

FIGURE 3 is another enlarged fragmentary axial cross-sectional view of another portion of the apparatus of FIGURE 1;

FIGURE 4 is an end view of the injection nozzle of the apparatus of FIGURE 1;

FIGURE 5 is a perspective view of one of the insulating elements utilized in the apparatus of FIGURE 1;

FIGURE 6 is a view similar to FIGURE 2 illustrating another embodiment of this invention;

Figure 7:
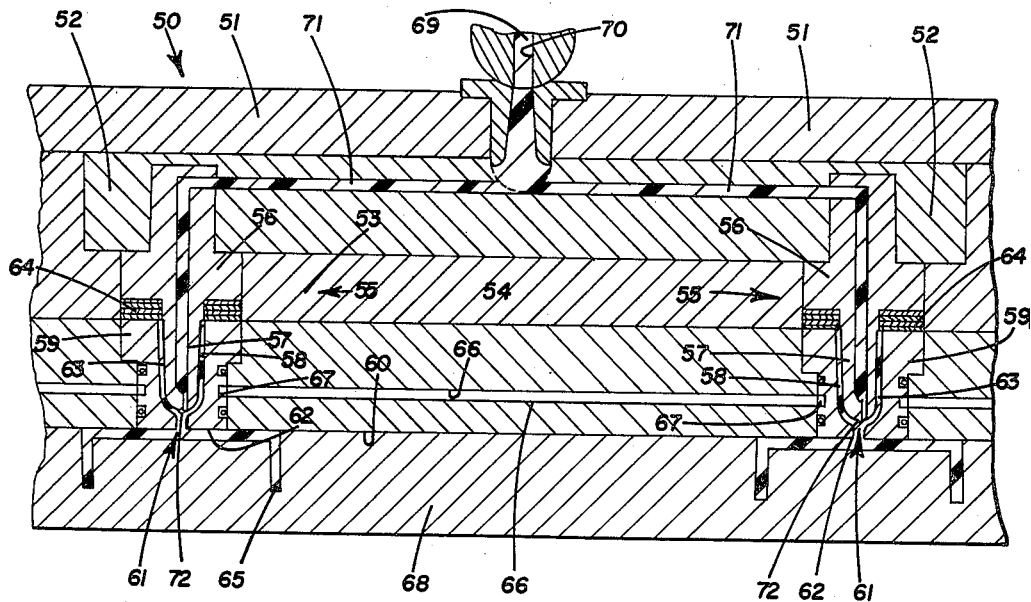
FIGURE 7 is an axial cross-sectional view of another molding apparatus of this invention.

Reference is now made to the accompanying drawings wherein like reference numerals are used throughout the various figures thereof to designate like parts where appropriate, and particular reference is made to FIGURE 1 illustrating an improved molding apparatus formed in accordance with the teachings of this invention and generally indicated by the reference numeral 10.

While the particular details of the improved injection nozzle of this invention are described in connection with the apparatus 10, it is to be understood that the same detailed description applies to apparatus illustrated in FIGURES 7 and 8 as well as other types of molding apparatus.

The apparatus 10 comprises a base member 11 having a pair of opposed flat surfaces 12 and 13, the lower surface 13 forming part of a mold chamber in a manner hereinafter described. A cavity 14 is formed in the base member 11 and respectively interrupts the opposed surfaces 12 and 13 thereof, the cavity 14 defining a mold chamber inlet gate 15 with the surface 13 of the base member 11.

In the embodiment illustrated in the drawing, the cavity 14 defines an internal wall 16 of the base member 11, the internal wall 16 having an upper portion 17 defining a truncated cone and a lower portion 18 defining an arcuate geometric figure.

As shown in FIGURE 2, the mold chamber inlet gate 15 is defined by an internal wall 19 of the base member 11. The internal wall 19 has an upper cylindrical portion 20 interconnecting the cavity 14 at one end thereof and a lower truncated conical portion 21 interconnecting the other end of the cylindrical portion 20.

The lower surface 13 of the base member 11 is adapted to cooperate with a reciprocally movable mold structure 22 to define a mold chamber 23 in the following manner. The movable member 22 is suitably recessed in a desired pattern as shown and when moved into intimate contact with the surface 13 of the base member 11, the surface 13 of the base member 11 closes off the recess formed in the member 22 whereby the surfaces 13 define part of the mold chamber 23.

A nozzle member, generally indicated by the reference numeral 24, comprises an elongated nozzle portion 25 projecting from an enlarged stepped portion 26, the enlarged portion 26 being interconnected to the nozzle portion 25 by a flat annular surface 27. The elongated nozzle portion 25 has an external wall 28 defining an upper stepped portion 29, an intermediate frusto conical portion 30, and an arcuate end portion or free end 31.

The nozzle member 24 may be formed of any good thermal conductive and high strength material, and in the preferred embodiment is formed from a beryllium and copper alloy, such as Berylco 25 manufactured by the Beryllium Corporation and comprising 1.90–2.15% beryllium, 0.20–0.35% cobalt, and the balance copper.

A plurality of flat washer-like elements 32 (see FIGURE 5) are press fitted in stacked relation on the stepped portion 29 of the nozzle member 24 against the flat surface 27 thereof. The nozzle member 24 is then assembled onto the base member 11 in such a manner that the elongated nozzle portion 25 projects within the cavity 14 and the washer-like elements 32 rest upon the top surface 12 of the base member 11 whereby the nozzle member 24 is spaced from the base member 11. The nozzle member 24 and base member 11 are drawn together by suitable interconnecting means, such as a nut and bolt arrangement (not shown) whereby the elements 32 are compactly compressed between the flat surface 27 of the nozzle member 24 and the flat surface 12 of the base member 11. In this manner, the elements 32 effectively insulate the nozzle member 24 from the base member 11 in a manner more fully described hereinafter.

The nozzle member 24 and the base member 11 are so constructed and arranged that the external wall 28 of the nozzle portion 25 is complementarily spaced from the internal wall 17 of the base member 11 when the members 11 and 24 are assembled together in the above manner. The external wall 28 of the nozzle member 24 cooperates with the internal wall 17 of the base member 11 to define an insulating zone 33 therebetween.

In order to maintain the nozzle 25 in its proper aligned position within the cavity 14 of the base member 11, a plurality of radially outwardly extending lugs or ears 34 project from the free end 31 of the nozzle 25 in the manner illustrated in FIGURES 1 and 4. In the preferred embodiment of this invention, the lugs 34 are normally slightly spaced from the internal surface 17 of the base member 11 to permit slight misalignment of the members 11 and 24 but not adverse misalignment thereof.

Suitable stepped passage means 35 is formed through the nozzle member 24. The passage means 35 terminates in a plurality of small passages 36 in the free end 31 of the nozzle portion 25, the passages 36 converging and being circularly and centrally arranged in the free end 31 thereof. Although the passage means 35 is illustrated as being stepped, the passage means 35 may be uniform or non-uniform throughout its length as desired.

The washer-like elements 32 may be formed of any suitable strong material having low thermal conductivity characteristics, and in the preferred embodiment are formed from a composition of stainless steel or tungsten carbide.

A small central projection 37 extends from the free end 31 of the nozzle portion 25 and is adapted to extend centrally into the mold chamber inlet gate 15 for a purpose hereinafter described. As shown in FIGURE 4, the projection 37 is centrally disposed with respect to the open ends of the circularly arranged passages 36.

The upper end of the passage means 35 is enlarged, as at 38, and is adapted to receive suitable molding material from a hopper or source of supply 39, the molding material generally being indicated by the reference numeral 40. The molding material 40 is fed from the hopper 39 to the passage means 35 by a suitable feed screw 41 driven by a motor 42. A selectively operable, reciprocating plunger 43 is adapted to be closely received with the upper portion of the passage means 35 of the nozzle member 24 and thus force a predetermined amount of the molding material 40 through the nozzle portion 25 in a manner well known in the art.

When a thermoplastic molding material, such as polyethylene, polystyrene, and the like, is being utilized to form molded products, the same must be heated in the range of 375° F. to 450° F. in order to liquefy the same.

Suitable heaters, shown schematically and generally indicated by the reference numeral 44, are utilized to heat the nozzle member 24 to the desired temperature for melting the particular molding material 40 being utilized.

The operation of the injection molding apparatus 10 will now be described. When the apparatus 10 is initially started, the mold structure 22 is raised against the lower surface 13 of the base member 11 to the position illustrated in FIGURE 1. The molding material 40 is then fed into the passage means 35 of the heated nozzle member 24 when the plunger or ram 43 is in its raised position as shown in dotted lines in FIGURE 1. As the molding material 40 is fed into the passage means 35 in the above manner, the heating elements 44 heat the nozzle member 24 to a relatively high temperature whereby the molding material 40 becomes molten in the passage means 35. When it is desired to mold an article, the ram 43 is moved vertically downwardly as shown in FIGURE 1, whereby the molten molding material 40 is forced out of the passage means 35 under pressure through the apertures 36 thereof into the mold gate 15, and thus into the mold chamber 23. After the mold chamber 23 has been completely filled, molding material 40 is forced upwardly by the ram 43 into the insulating zone 33 whereby molding material 40 completely surrounds the nozzle portion 25. Once the insulating zone 33 has been filled with molding material 40, the above filling operation is not repeated.

As previously stated, the base member 11 must have at least the surface 13 thereof maintained at a substantially low temperature in order to permit the molding material 40 forced into the mold chamber 23 to rapidly solidify and thus form an improved molded product. For example, certain thermoplastic molding materials form excellent molded products when the structure defining the mold chamber is maintained at approximately 40° F. Therefore, the molding material 40 now contained in the insulating zone 33 forms a heat insulating barrier between the heated nozzle 25 and the base member 11. Any tendency of the molding material 40 in the insulating zone 33 to seep out of the upper end thereof is prevented by the washer-like elements 32, the elements 32 closing the upper end of the insulating zone 33. In particular, any molten molding material 40 tending to seep between the bottom element 32 and the top surface 12 of the base member 11 solidifies before the same has reached the exterior thereof since the base member 11 is maintained at a relatively low temperature and the washer-like elements 32 are poor conductors of heat. Further, since the nozzle member 24 is heated and is formed of a material having a greater coefficient of expansion than the washer-like elements 32, a close fit is created between the elements 32 and the stepped portion 29 of the nozzle member 24. However, if any molding material 40 should seep therebetween and thus between adjacent surfaces of the elements 32, the molding material 40 would solidify before the same has reached the exterior of the stacked elements 32 as the elements 32 are poor conductors of heat and thus remain relatively cold at the outer portions thereof.

In this manner, the washer-like elements 32 provide a good heat insulating barrier between the nozzle member 24 and the base member 11.

After the first article has been molded in the above manner the mold defining structure 22 is lowered from the mold surface 13 whereby the solid molded structure breaks away from the gate 15. As previously stated, in prior known molding apparatus, the molding material remaining at the mold chamber inlet gate solidifies as the base member in the region of the gate is maintained at a relatively low temperature. However, according to the teachings of this invention, the projection 37 extending from the nozzle 25 sufficiently heats the molding material 40 in the region of the gate 15 so that the same cannot solidify and close the gate 15. In this manner, after a molded article has been removed and the mold defining structure 22 raised to the position illustrated in FIGURE 1, the mold apparatus 10 can mold another article without requiring the removal of a solidified plug at the gate 15 as is common in the practice.

It has also been found that the heated projection 37 of the nozzle member 24 cooperates with the gate 15 in such a manner that the resulting product is substantially sprueless when the product breaks away from the gate 15 (see FIGURE 2) whereas in conventional molding apparatus an extended sharp pointed sprue normally projects from the product (see FIGURE 2A) and requires an additional production operation of removing or trimming the sprue.

In the preferred embodiment of this invention, the projection 37 terminates in the region where the cylindrical portion 20 of the gate wall 19 joins the conical portion 21 thereof. However, it is to be understood that the particular length and shape of the projection 37 may vary depending upon the particular molding material being utilized and the particular results desired. For example, see FIGURE 6 wherein the projection 37' is relatively small although the functions of the projection 37' are the same as the projection 37 as set forth above and hereinafter described.

It has also been found that the projection 37 cooperates with the slanting passages 36 in such a manner that when pigment particles are mixed with the molding material 40 in the hopper 39, the projection 37 creates a turbulence of the molding material passing through the gate 15 in such a manner that the pigment is thoroughly mixed in the molding material and thus provides a homogeneous coloring of the molded article.

As shown in FIGURE 7, another type of molding apparatus of this invention is illustrated and is indicated generally by the reference numeral 50. The apparatus 50, referred to as "a hot runner system," comprises a plurality of flat plate-like members 51, 52, 53 and 54 suitably secured together, the plate-like members 53 and 54 being heat insulated from each other by suitable means if desired and the plate-like member 54 being hereinafter referred to as a base means.

A plurality of improved nozzle arrangements 55 are carried by the apparatus 50 as illustrated and each comprises a nozzle member 56 having an elongated nozzle 57 received within a complementarily shaped cavity 58 formed in a base member 59 forming part of the base means 54. Each cavity 58 interrupts a lower surface 60 of the base means 54 to define a mold chamber inlet gate 60 therewith, the lower surface 62 of each base member 59 forming part of the lower surface 60 of the base means 54. The cavities 58 and nozzles 57 cooperate together to define insulating zones 63 in the manner previously described. Similarly, a plurality of stacked washer-like members 64 close off one end of each zone 63 and insulate the nozzles 57 from the base means 54.

As previously described, the base means 54 must be maintained at a relatively low temperature as part of the lower surface 60 thereof forms part of the mold chambers 65 hereinafter described. In order to cool the base means 54, passage means 66 is formed therein which is adapted to circulate a cooling medium through the base means 54, the passage means 66 interconnecting with annular grooves 67 formed respectively in the outer periphery of the bases 59.

A movable member 68 being suitably recessed cooperates with the base means 54 to form the mold chambers 65 when the member 68 is in the position illustrated in FIGURE 7.

The operation of the molding apparatus 50 will now be described. Molding material, generally indicated by the reference numeral 69, is fed under pressure from a source (not shown) into an inlet 70. The molding material 69 is directed to the various nozzles 57 by runners or passages 71 formed in the apparatus 50. The molding material is thus forced through the inlet gates 61 into the mold chambers 65.

Since the plates 51, 52 and 53 are heated by suitable means as well as the nozzle members 56, the temperature of the molding material 69 can be completely controlled until the same enters the mold chambers 65. Further, the washer-like members 64 and the filled insulating zones 63 insulate the heated nozzle members 56 from the base means 54 in the manner previously described.

The nozzle projections 72 prevent "freezing" of the molding material in the respective gates, prevent the formation of objectionable sprues on the respective molded products, and maintains the molding material in the respective mold chamber inlet gates at such a temperature that the same does not flow from the gates when the lower member 68 is moved away from the base means 54 after the products have been molded in the chambers 65.

While the apparatus 50 is illustrated as having two nozzle arrangements 55, it is to be understood that any number of nozzle arrangements 55 may be provided, each nozzle arrangement 55 being interconnected with the inlet 70 by runners or passages 71.

Figure 8:
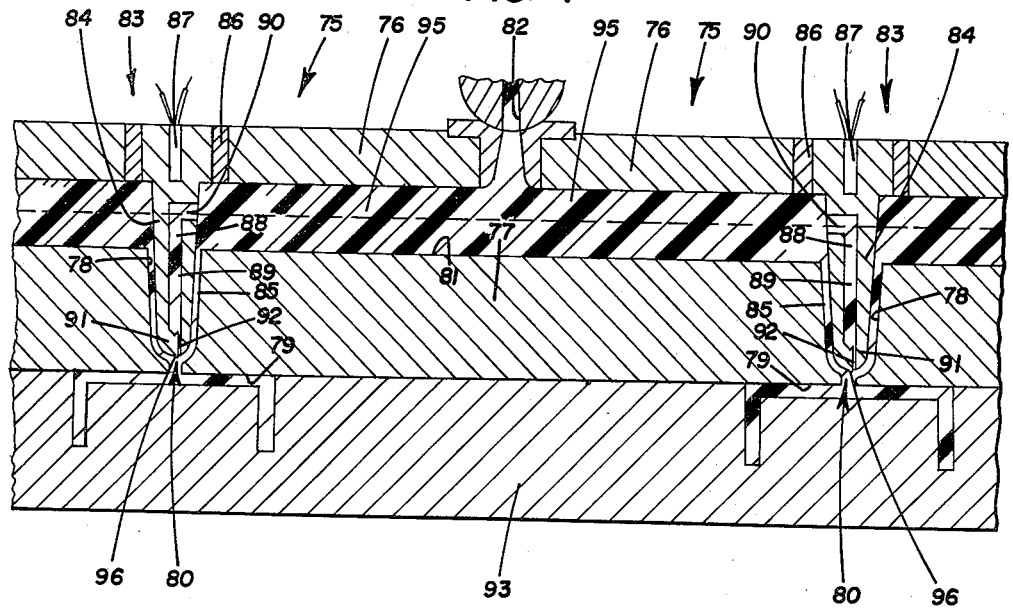
FIGURE 8 is an axial cross-sectional view of still another molding apparatus of this invention.

Another molding apparatus of this invention is illustrated in FIGURE 8 and is indicated generally by the reference numeral 75. The apparatus 75 is referred to as an "insulated or cold runner system" and comprises a plurality of plate-like members 76 and 77 suitably secured together, the member 77 hereinafter being referred to as a base means. A plurality of cavities 78 are formed in the base means 77 and respectively interrupt the lower surface 79 thereof to define a plurality of mold chamber inlet gates 80 therewith. The cavities 78 are interconnected with each other by a runner or passage 81 formed respectively in the mating surfaces of the members 76 and 77, the runner or passage 81, in turn, being interconnected with a common inlet 82.

A plurality of nozzle arrangements 83 are carried by the apparatus 75 and have elongated nozzles 84 respectively disposed in the cavities 78 and define insulating zones 85 therewith in the manner previously described.

The nozzle members 83 are respectively heat insulated from the plate-like member 76 by suitable bushings 86 formed of a strong material having low thermal conductivity characteristics, such as compositions of stainless steel or tungsten carbide.

Since the plate-like members 76 and 77 remain relatively cold, the nozzle members 83 are heated by suitable means, and in the embodiment illustrated in the drawings, the nozzle members 83 are heated by resistance heaters 87.

Passage means 88 are formed in the nozzle members 83 and each comprises an elongated passage 89 interconnected with the central portion of the runner 81 by a passage 90 and the free end 91 of the nozzle 84 by the circularly arranged passages 92 in the manner previously described. In order to form the passage 89 the nozzle member 83 may be formed of two pieces suitably secured together, such as by silver soldering or the like or the heater 87 may be off-set relative to the passage 89 whereby the passage 89 can be drilled into the nozzle 84 and the same be separated from the heater 87.

A suitably recessed movable member 93 cooperates with the lower surface 79 of the base means 77 to define mold chambers 94 in the same manner as the members 22 and 68 previously described.

The operation of the apparatus 75 will now be described. Suitable heated molding material 95 is forced through the inlet 82 into the runner passage 81 and insulating zones 85 to insulate the heated nozzles 84 from the base means 77. The molding material 95 is then forced under pressure through the passage means 88 of nozzles 84 and thus into the mold chambers 94 in the manner previously described. Since the plate-like members 76 and 77 are relatively cold, the molding material 95 solidifies adjacent the surfaces thereof defining the runner passage 81 whereas the molding material 95 in the central region of the runner passage 81 remains molten and can thus be forced into the heated nozzle members 83 through the passages 90 thereof.

Projections 96 are formed respectively on the free ends 91 of the nozzles 84 and function in the same manner as the projections 37, 37′ and 72.

It should be understood that while only two nozzle arrangements 83 are illustrated, the apparatus 75 may be provided with any desired number whereby a plurality of molded products may be simultaneously formed.

Therefore, it can be seen that there has been provided improved molding apparatus, each of which not only has means for preventing a solidification of the molding material in the mold chamber inlet gate, but which also effectively permits the molded article to solidify at a rapid rate as effective insulating means are provided between the heated and non-heated elements of the molding apparatus. Further, the resulting molded product or products are substantially sprueless.

While the foregoing presents preferred embodiments of the present invention, it is obvious that modifications and/or equivalents may be employed without departing from the scope of the invention, which is defined in the appended claims.

What is claimed is:

1. An apparatus having a mold chamber, a base member having a surface defining at least part of said mold chamber, said base member having a cavity interrupting said surface and defining a mold chamber inlet gate therewith, said cavity being defined by an internal wall of said base member, a molding material dispensing nozzle disposed in said cavity and having an external wall spaced from said internal wall of said base member whereby said walls define an insulating zone between said base member and said nozzle, insulating means disposed in said insulating zone, and a blunt-tipped inperforate projection extending from said nozzle, said projection extending into and being spaced inwardly from the side walls of said gate, said nozzle having at least one discharge port eccentrically located relative to said projection.

2. An apparatus as set forth in claim 1 wherein said insulating means comprises molding material.

3. An apparatus according to claim 1 additionally comprising a plurality of flat washer-shaped elements disposed about said nozzle and being compressed between said nozzle and said base member whereby said elements insulate said base member from said nozzle and close one end of said insulating zone.

References Cited in the file of this patent

UNITED STATES PATENTS

| | | |
|---|---|---|
| 2,227,966 | Emsley | Jan. 7, 1941 |
| 2,478,823 | Halbach | Aug. 9, 1949 |
| 2,814,831 | McKee | Dec. 3, 1957 |
| 2,890,488 | Gemberling | June 16, 1959 |
| 2,904,839 | Beckwith | Sept. 22, 1959 |
| 2,911,680 | Kelly | Nov. 10, 1959 |
| 2,928,125 | Smucker | Mar. 15, 1960 |
| 3,010,155 | Gilmore | Nov. 28, 1961 |